Nov. 5, 1957  M. B. HAMMOND  2,812,014
INSULATOR PADS AND METHOD OF MAKING SAME
Filed Oct. 28, 1953  2 Sheets-Sheet 1
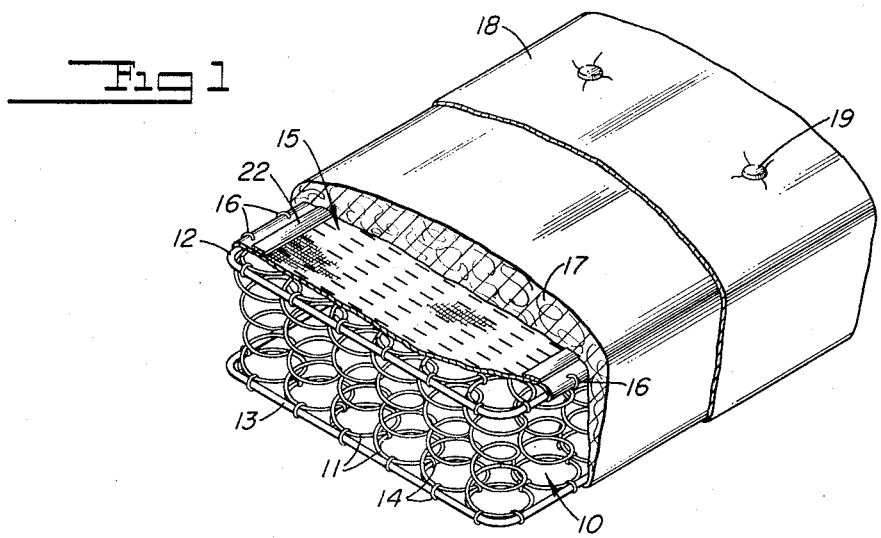
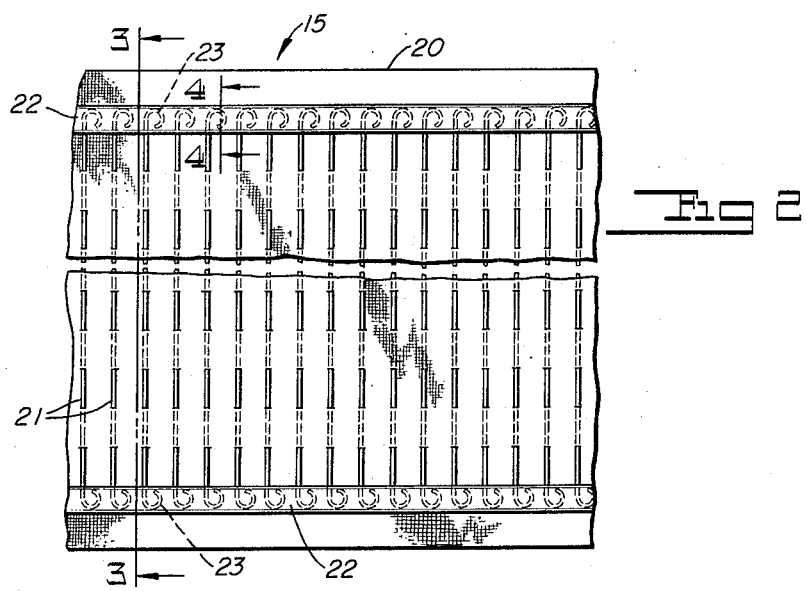
INVENTOR.
Milton B. Hammond
ATTORNEYS.

Nov. 5, 1957  M. B. HAMMOND  2,812,014
INSULATOR PADS AND METHOD OF MAKING SAME
Filed Oct. 28, 1953  2 Sheets-Sheet 2

*INVENTOR.*
Milton B. Hammond
BY *Gray, Mase*
*Wildermuth & Dunson*
ATTORNEYS.

United States Patent Office 2,812,014
Patented Nov. 5, 1957

2,812,014

INSULATOR PADS AND METHOD OF MAKING SAME

Milton B. Hammond, Edgeworth, Pa., assignor to Rockwell Spring and Axle Company, Coraopolis, Pa., a corporation of Pennsylvania Application October 28, 1953, Serial No. 388,809

1 Claim. (Cl. 155—181)

This invention relates to reinforced sheet material and, in particular, to that used as a liner or insulator pad in spring-cushion units.

In the construction of spring-cushion units, various means have been used to prevent the cushion material from being pushed down in the spaces within and between the springs. This problem has presented itself in the manufacture and use of mattress and seat-cushion units which employ either coil springs, zigzag springs, or other resilient structures as a base. A familiar example of the use of spring-cushion units, which will be discussed in the disclosure of this invention, although it is not limited thereto, is the seat and back cushion of a motor vehicle.

As will later be described with particularity, spring-cushion units of the type involved herein, are usually built up commencing with a wire spring assembly, which has resilient members incorporated therein. Over the top of this spring assembly, a liner or insulator pad is placed completely covering the wire springs beneath. A cushion which is usually cotton batting, but in some cases foam rubber, is positioned over the insulator pad. Upholstery material is stretched over the cushion and down the sides enclosing the assembly.

From this preliminary description of the relation between the spring assembly and the cushion, the need for an insulator pad is apparent. Pressure on the surface of the assembled unit, caused by a person's sitting or lying on it, pushes the cushion material down; and, were it not for the insulator pad, it would be forced through the openings in the spring assembly. Should this occur, the cushion would become bumpy and uncomfortable in a very short time.

The continuous motion and action which takes place in the spring-cushion unit as a whole, during its use, is well known. In the spring assembly or base portion, the springs themselves flex whenever the load is either increased, decreased, or relieved entirely. This happens whenever anyone gets on or off the unit. In units used in motor vehicles, further action takes place when the vehicle goes over a bump or sways in turning a corner.

Since the upper surface of the spring assembly is in contact with the insulator pad, the above-described action causes the upper surface of the spring assembly to rub and move about on the surface of the insulator pad. At the contact points between the spring assembly and the insulator pad, the rubbing action has a tendency to cause abrasion. For this reason, insulator pads should be tough and abrasion resistive.

Obviously, insulator pads should be flexible in order not to impair the comfort qualities of the unit.

Competition in the spring-cushion industry makes the matter of cost a primary consideration, and, therefore, insulator pads should be inexpensive to manufacture and assemble.

A substantial part of the industry has standardized on the general construction for insulator pads which employ a woven fabric, such as burlap or canvas having wire reinforcing stays fixed thereto, usually in parallel spaced relation. U. S. Patent 2,227,685 to Williams discloses a typical example of this type of pad. In all known types of pad, the problem of securing the ends of the stays has been troublesome.

It is an object of this invention, therefore, to provide a method of fixing the ends of the reinforcing stays in insulator pads which is an improvement over prior types, and to obtain, as an article of manufacture, an improved insulator pad therefrom. Accordingly, a specific object is to provide an insulator pad in which each reinforcing stay is securely but flexibly attached, not only to the material of the pad itself, but also to the adjacent stay on each side. Another object is to provide an insulator pad in which failure of the attachment at any one stay will not affect the attachment of the adjacent or other stays in the spring-cushion unit. A further object is to provide an insulator pad in which reinforcing stays are attached by an improved technique which affords a stronger attachment. Still another object of this invention is the provision of an insulator pad attachment means on which the effects of the atmosphere and normal usage abrasion will be negligible.

As corollaries to the above objects, other purposes of this invention are to provide a method of manufacturing insulator pads which is relatively inexpensive involving comparatively little hand labor and not subject to frequent costly shutdowns for repairs. Specifically, another object is to provide a method of attaching reinforcing stays to insulator pads which is suitable for mass-production practice. Another object is to provide a method of manufacturing insulator pads in which the wire-stay attachment material may be formed and shaped at the time of its application to the pad material and to the reinforcement stays.

Other objects and advantages of the present invention will be apparent from the following detailed description thereof, when read in conjunction with the accompanying drawings, in which:

Fig. 1 is a cutaway perspective view of a typical motor-vehicle seat spring-cushion unit showing a portion of an insulator pad according to this invention;

Fig. 2 is a plan view of a portion of an insulator pad according to this invention;

Fig. 3 is a broken sectional view taken on the line 3—3 of Fig. 2;

Figure 4:
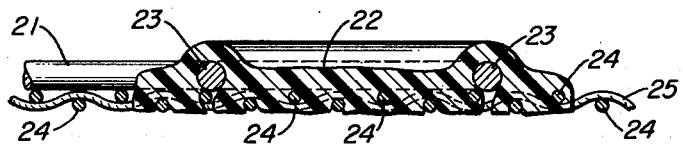
Fig. 4 is an enlarged sectional view taken on the line 4—4 of Fig. 2.

In general, the present invention relates to insulator pads which have wire reinforcement stays attached thereto and wherein these stays are attached by being imbedded under or in a flexible plastic layer, which layer is bonded to, and may be enmeshed with, the pad material. This invention further relates, in general, to a mass-production method of attaching the reinforcement stay ends in the manufacture of insulator pads.

In Fig. 1 a spring assembly 10, in this instance made up of a group of coil springs 11, is held in assembly by an upper frame 12, a lower frame 13, and steel clips 14. An insulator pad 15, in accordance with this invention, is in contact with the apertured upper surface of spring assembly 10. The insulator pad 15 may be attached to the upper frame 12 with steel clips 16. Over insulator pad 15, and in contact therewith, is a cushion material 17 which may be cotton batting or foam rubber. Overlaying the cushion material 17 is upholstery fabric 18. This upholstery fabric is usually drawn down the four sides and turned under the lower frame 13 where it is fastened by steel clips, not shown. In many cases upholstery buttons 19 are used at spaced intervals to anchor the various materials and thus to prevent undesirable shifting between these materials.

As shown in Figs. 2 and 3, an insulator pad of this invention comprises a sheet-like material 20, reinforcing stays 21, and plastic attachment strips 22.

The sheet-like material 20 is usually burlap or canvas fabric, but may be other fibrous materials. Further in this regard, the material of the insulator pad may be a flexible plastic sheet, such as polyethylene, nylon, polyvinyl chloride with plasticizer added, copolymers of polyvinyl chloride with plasticizer added, or polyvinyl butyral with plasticizer added. Other thermoplastics may be used which, under normal atmospheric conditions, are tough, abrasion resistant, and unaffected by moisture.

This material may be cut from sheets larger than required for the width of a spring assembly, but most often will be available from a roll of the necessary width, and capable of being processed substantially continuously in the longitudinal direction from the roll.

Reinforcing stays 21 are usually made of steel wire, but fiber glass cord, nonferrous wire, or other strong, flexible materials may be used.

Figure 6:
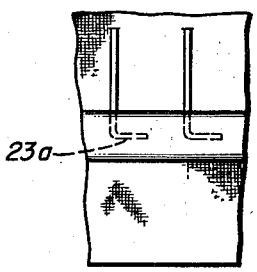
Fig. 6 is an enlarged plan view of a portion of an insulator pad according to this invention.

These reinforcing stays 21 are most often positioned transverse to the longitudinal direction of the material and substantially parallel to each other. Each stay 21 is laced back and forth through the material 20 and the stays are distributed over substantially the complete surface of the pad. Both ends 23 of each stay are formed in loops, shown in Fig. 2, or alternatively a stay may have its end turned at right angles to its longitudinal axis, as shown at 23a in Fig. 6. In either case, the mid-plane of the formed end portion is positioned parallel to the surface of the material 20. In other words, the end projection 23 or 23a, lies flat on the surface of the material 20.

In the manufacturing process, the stays 21 may be inserted in the fabric by automatic machinery adapted to operate in continuous fashion as the material 20 is unreeled from a roll and passed beneath. The process of inserting the stays and forming the ends is well known in the art and is not a part of this invention except as it applies in combination with other processes of this invention.

Plastic strips 22 may be composed of polyethylene, nylon, polyvinyl chloride with plasticizer added, copolymers of polyvinyl chloride with plasticizer added, polyvinyl butyral with plasticizer added, or other thermoplastic material which is flexible under normal atmospheric conditions, which is resistant to temperature and moisture conditions of the atmosphere, and which is tough and resistant to abrasion. Polyethylene is particularly suited as a plastic attachment material in this invention because it is resistant to moisture, keeps its strength with age, is tougher than most other plastic materials, and its physical properties remain constant through a wider range of temperature conditions than most other plastics.

Plastic strips 22 are positioned longitudinally with the material 20, over the loops 23 or turned ends 23a of the stays 21, and are bonded to the material 20.

Fig. 4 shows longitudinal threads 24 woven with transverse threads 25 of the fabric 20. In this view, it can be clearly seen how the plastic 22 is enmeshed with threads 24 and 25 accomplishing an effective bond. The bond between the plastic 22 and the material 20 is further enhanced by the adhesion of the plastic 22 to the fibers of the material 20 itself.

If, as previously mentioned, the insulator-pad material 20 used is not a fabric, but is a flexible sheet, the bond accomplished between the strips 22 and the material 20 is a thermally produced weld at the line of contact between the materials.

Insulator pads according to this invention are manufactured by applying a hot plasticized strip along the line of the stay loops or ends. Immediately following the application, compression is applied to the top of the strip preferably with a cold instrument. The compression forces the plasticized material into the mesh of the fabric as shown in Fig. 4, when fabric is the insulator-pad material. Natural adhesion takes place between the fibers of the material 20 and the plastic 22 at the same time. When the insulator-pad material is a plastic sheet, the compression enhances the weld between the strips and the insulator pad. When the compression instrument is cold, it congeals the contact surface between itself and the plastic, thus preventing any adhesion thereto. At the same time the plasticity of the plastic is quickly reduced. As soon as the plastic reaches a temperature below its normal softening temperature, the insulator pad is ready for use.

Figure 5:
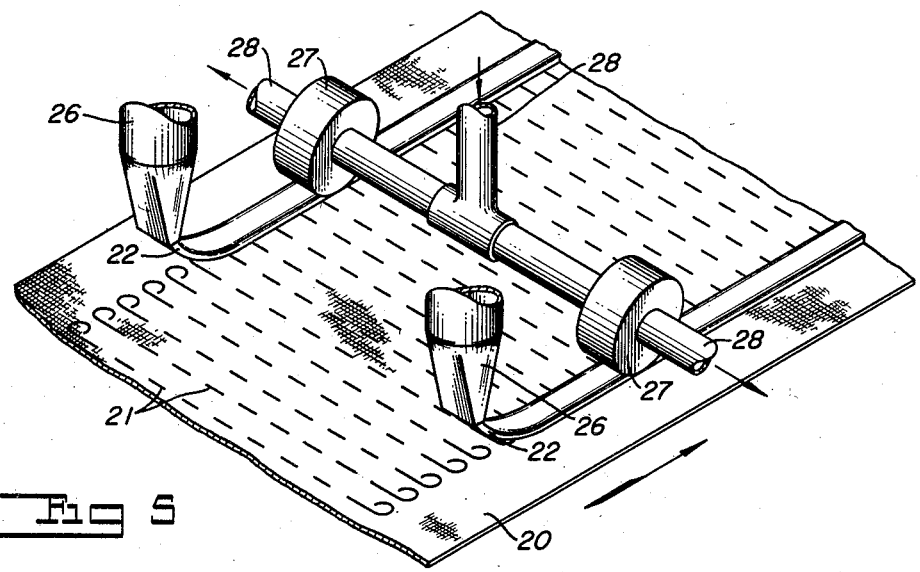
Fig. 5 is a diagrammatic perspective view showing the method of this invention in practice with suitable apparatus.

Fig. 5 shows apparatus capable of carrying out the above-described method. Insulator-pad material 20, having reinforcing stays 21 in place, and sliding on a table or being carried by other conveying means, not shown, passes continuously beneath plastic extrusion equipment 26. Plasticized strips 22 are extruded and applied on the insulator pad 20 in position as previously described. Immediately following the application, the strips 22 pass under and are compressed by rollers 27, which are maintained cold by conduction from a coolant circulating in pipes 28. The coolant may be either a refrigerated brine, an expanded refrigerant gas, such as Freon 12, or cold water. Compression on the strips is provided as the strips 22 pass between the rollers 27 and a table or conveyor surface, not shown.

The improvements of this invention are easily discerned when viewed in connection with prior commonly used methods. In one of the commonly used techniques the ends of the stays are formed with loops through which twine or fiber cord is inserted. The cord is laced through the loops of adjacent stays and anchored in a conventional fashion, such as with hog rings (steel clips), to the spring assembly frame. There is the attendant problem that, should the previously described rubbing action fray the cord until it parts, all of the stays through which it has been laced may become free at one end. The reinforcing effect of the wire stays is reduced thereby and early insulator-pad failure may result.

In another of the commonly used techniques, the ends of the stays are formed with loops, over which and through which heavy sewing-machine stitching is run. This is done by sewing over the loops, usually by passing the sewing machine in a transverse direction to the line of each stay, over each successive loop in continuous fashion along the line of loops. This method requires skill on the part of the sewing-machine operator, and attendant high wages must be paid. Quite often, although the operator is skilled, the needle of the sewing machine may strike on the wire of the loop over which the machine is passing. The result of this is frequently a broken needle which necessarily requires costly time to rectify. This technique is again subject to the disadvantage that, should a thread become broken by abrasion, the thread, being continuous from one stay to the next, may unravel releasing the reinforcing stays at one end.

Both of the above-described old methods use a stay attachment material, either twine or thread, which is not resistant to the effects of the atmosphere, such as moisture. This can be a disadvantage by leading to early failure when the seat-cushion unit is inadvertently subjected to moisture. In the motor-vehicle field, this occurs quite frequently when the vehicle windows are left open during a rain storm.

It can be seen that the insulator pads of this invention embody certain improvements in reinforcement-stay attachment. The stays are attached to the insulator pad individually. Thus, the holding forces in the strips are much reduced in comparison with the previously described twine lacing where the aggregate forces imposed by all the reinforcement wires are transmitted to the twine and in the twine to the point at which it is attached to the spring assembly frame. Another improvement is that, should the strip fail at any one point along its length, only the one reinforcement stay attached thereunder will be released; whereas, should the twine lacing fail under similar circumstances, all reinforcing stays held by the twine may be released. An improvement of this invention is the large area of contact between the strip and the stay ends. The stay end is encased on three sides with plastic material. Here again forces are distributed and lessened per unit area in comparison with, for example, the previously described stitching method of stay attachment.

The plastic material itself, and especially polyethylene, provides several advantages to the insulator pads of this invention. The attendant problems caused by moisture which inadvertently reaches the attachment material no longer exists, as the strips of this invention are not affected by moisture. The plastic material is resistant to the previously described rubbing action which takes place in spring-cushion units.

Improvements are apparent also in the method of manufacturing insulator pads according to this invention. Since this method may be performed continuously with the use of labor-saving apparatus, economies are accomplished in the manufacturing process. One complete operation of prior processes has been eliminated by formation and application of the attachment material in one operation. The strip is manufactured and applied to the insulator pad in the process. In the old processes, the twine or stitching must be manufactured separately and applied by separate means. Shutdowns because of broken sewing machine needles are eliminated.

It will be understood, of course, that while the forms of the invention herein shown and described constitute preferred embodiments of the invention, it is not intended herein to illustrate all of the possible equivalent forms or ramifications of the invention. For example, if a conservation of plastic-attachment material is desired, drops or globules may be deposited over each stay or stay end, instead of continuous strips. Another modification is the application of more than the two strips over the stays. Additional strips may be desirable on insulator pads used for mattresses and other applications which are larger and/or subjected to severe use. Another method of applying plastic strips would comprise depositing them in preformed strip form over the stays, such as from a roll, and applying sufficient heat to their exposed surface that they may be compressed into bonding contact with the insulator pad.

It will also be understood that the words used are words of description rather than of limitation, and that various changes, such as in shape, relative size, and arrangement of parts, may be substituted without departing from the spirit or scope of the invention herein disclosed.

What is claimed is:

A reinforced fabric insulator pad for spring cushion units comprising: a fabric sheet, reinforcing stays juxtaposed at the surface of said sheet; and a single thermoplastic material disposed over and around said reinforcing stay ends when plasticized by heat and enmeshed with said fabric sheet providing the sole attachment means between said reinforcing stays and said fabric sheet when flexible at normal ambient temperature.

References Cited in the file of this patent

UNITED STATES PATENTS

| | | |
|---|---|---|
| 1,883,562 | Chipman et al. | Oct. 18, 1932 |
| 2,008,158 | Van Dresser | July 16, 1935 |
| 2,094,074 | Lee et al. | Sept. 28, 1937 |
| 2,221,507 | Clark | Nov. 12, 1940 |
| 2,576,729 | Shockey | Nov. 27, 1951 |
| 2,638,154 | Dewees | May 12, 1953 |

OTHER REFERENCES

Modern Plastics Magazine, December 1950, pp. 67–71.